(12) United States Patent
Kusano et al.

(10) Patent No.: US 6,217,127 B1
(45) Date of Patent: Apr. 17, 2001

(54) MASTER CYLINDER DEVICE AND HYDRAULIC BRAKE DEVICE FOR A VEHICLE

(75) Inventors: Akihito Kusano, Toyota; Hiroaki Aizawa; Hiroshi Toda, both of Kariya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/265,370

(22) Filed: Mar. 10, 1999

(30) Foreign Application Priority Data

Mar. 10, 1998 (JP) .................................................. 10-057880
Sep. 24, 1998 (JP) .................................................. 10-268821

(51) Int. Cl.$^7$ .................................................... B60T 13/74
(52) U.S. Cl. ............................................................... 303/3
(58) Field of Search ........................... 303/113.4, 113.3, 303/114.1, 115.1, 3, 5, 20, DIG. 3; 188/106 P, 156, 158, 159; 60/582, 592

(56) References Cited

U.S. PATENT DOCUMENTS 5,421,643 * 6/1995 Kirchner .................................... 303/3
5,531,509 * 7/1996 Kellner .............................. 303/114.1
5,567,021 * 10/1996 Gaillard .................................... 303/3

FOREIGN PATENT DOCUMENTS

| 57-84249 | 5/1982 | (JP) . |
| 58-39551 | 3/1983 | (JP) . |
| 5-319245 | 12/1993 | (JP) . |
| 10-167042 | 6/1998 | (JP) . |

* cited by examiner

Primary Examiner—Christopher P. Schwartz
Assistant Examiner—C. T. Bartz
(74) Attorney, Agent, or Firm—Burns, Doane, Swecker & Mathis, LLP

(57) ABSTRACT

A load transmitting elastic member is interposed between an input rod and a piston of a master cylinder or a piston of a pedal stroke simulator to which the operation force of a brake pedal is applied from the input rod. The set load of the load transmitting elastic member is lower than the predetermined load required for causing the piston to begin to slide and the maximum load of the load transmitting elastic member is higher than the predetermined load required for causing the piston to begin to slide. The stroke of the brake pedal thus begins through application of a small depression force applied to the brake pedal and so the operational feeling of the brake pedal is improved.

19 Claims, 6 Drawing Sheets

MASTER CYLINDER DEVICE AND HYDRAULIC BRAKE DEVICE FOR A VEHICLE

This application is based on and claims priority under 35 U.S.C. § 119 with respect to Japanese Application No. 10(1998)-57880 filed on Mar. 10, 1998 and Japanese Application No. 10(1998)-268821 filed on Sep. 24, 1998, the entire content of both of which is incorporated herein by reference.

FIELD OF THE INVENTION

The present invention generally relates to a vehicle brake system. More particularly, the present invention pertains to a master cylinder device and a hydraulic brake device for a vehicle which are provided with a pedal stroke simulator.

BACKGROUND OF THE INVENTION

Japanese Patent Application Laid-Open Publications Nos. 57(1982)-84249, 58(1983)-39551 and 5(1993)-319245 disclose hydraulic braking devices that include a power hydraulic pressure source and a master cylinder which is operatively connected to a brake pedal. In this hydraulics brake device, the hydraulic pressure having a magnitude corresponding to the depressed force of the brake pedal is applied from the power hydraulic pressure source to the wheel brakes when the power hydraulic pressure source is in the normal condition, and the hydraulic pressure in applied from the master cylinder to the wheel brakes when the power hydraulic pressure source is in the abnormal condition. This hydraulic brake device further includes a pedal stroke simulator for generating a stroke of the brake pedal corresponding to the depressed force applied to the brake pedal when the power hydraulic pressure source is in the normal condition.

In the devices described above, however, the brake pedal does not move unless the piston of the pedal stroke simulator and the pistons of the master cylinder begin to slide, and the load or force required to make the pistons of the pedal stroke simulator and the master cylinder begin to slide is relatively high. As a results an operational feeling of the brake pedal deteriorates.

In light of the foregoing, a need exists for a master cylinder and hydraulic braking device that are not as susceptible to the same disadvantages and drawbacks as described above.

It would be desirable to provide a master cylinder and hydraulic braking device in which the operational feeling of the brake pedal is not diminished.

SUMMARY OF THE INVENTION

In accordance with a first aspect of the present invention, a master cylinder device includes a pedal stroke simulator having a piston connected to a brake pedal for generating, upon stroke of the brake pedal, a stroke corresponding to the operating force applied to the brake pedal, and a master cylinder operated by the operation of the brake pedal through the piston of the pedal. A load transmitting elastic member is interposed between the piston of the pedal stroke simulator and the brake pedal. The load transmitting elastic member has a set load that is lower than a predetermined load required for causing the piston to begin sliding movement and having a maximum load that is higher than the predetermined load.

According to another aspect of the present invention, a master cylinder device includes a master cylinder having a piston connected to a brake pedal, and a pedal stroke simulator for generating, upon stroke of the brake pedal, a stroke corresponding to the operating force applied to the brake pedal. A load transmitting elastic member is interposed between the piston of the master cylinder and the brake pedal, with the load transmitting elastic member possessing a set load that is lower than a predetermined load required to begin sliding movement of the piston and having a maximum load that is higher than the predetermined load.

According to an additional aspect of the present invention, a vehicle hydraulic brake device includes a pedal stroke simulator having a piston connected to a brake pedal for generating, upon operation of the brake pedal, a stroke corresponding to the operating force applied to the brake pedal, a master cylinder operated by the operation of the brake pedal through the piston of the pedal stroke simulator, a power hydraulic pressure source for generating hydraulic pressure, a wheel brake mounted on a wheel of the vehicle for braking the wheel, and control means for applying hydraulic pressure from the power hydraulic pressure source to the wheel brake in response to the operation of the brake pedal when the power hydraulic pressure source is in the normal condition and for applying hydraulic pressure from the master cylinder to the wheel brake when the power hydraulic pressure source is in the abnormal condition. A load transmitting elastic member is interposed between the piston of the pedal stroke simulator and the brake pedal. The load transmitting elastic member has a set load that is lower than the predetermined load required for causing the piston to begin sliding and has a maximum load that is higher than the predetermined load.

According to a further aspect of the invention, a hydraulic brake device for a vehicle includes a master cylinder having a piston connected to a brake pedal, a pedal stroke simulator for generating, upon brake pedal stroke, a stroke corresponding to the operating force applied to the brake pedal, a power hydraulic pressure source for generating hydraulic pressure, and a wheel brake mounted on the wheel of the vehicle for braking the wheel. A hydraulic pressure control device applies the hydraulic pressure from the power hydraulic pressure source to the wheel brake in response to the operation of the brake pedal when the power hydraulic pressure source is in the normal condition and applies the hydraulic pressure from the master cylinder to the wheel brake when the power hydraulic pressure source is in the abnormal condition. A load transmitting elastic member is interposed between the piston of the master cylinder and the brake pedal, and has a set load that is lower than a predetermined load required for making the piston begin to slide and a maximum load that is higher than the predetermined load.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
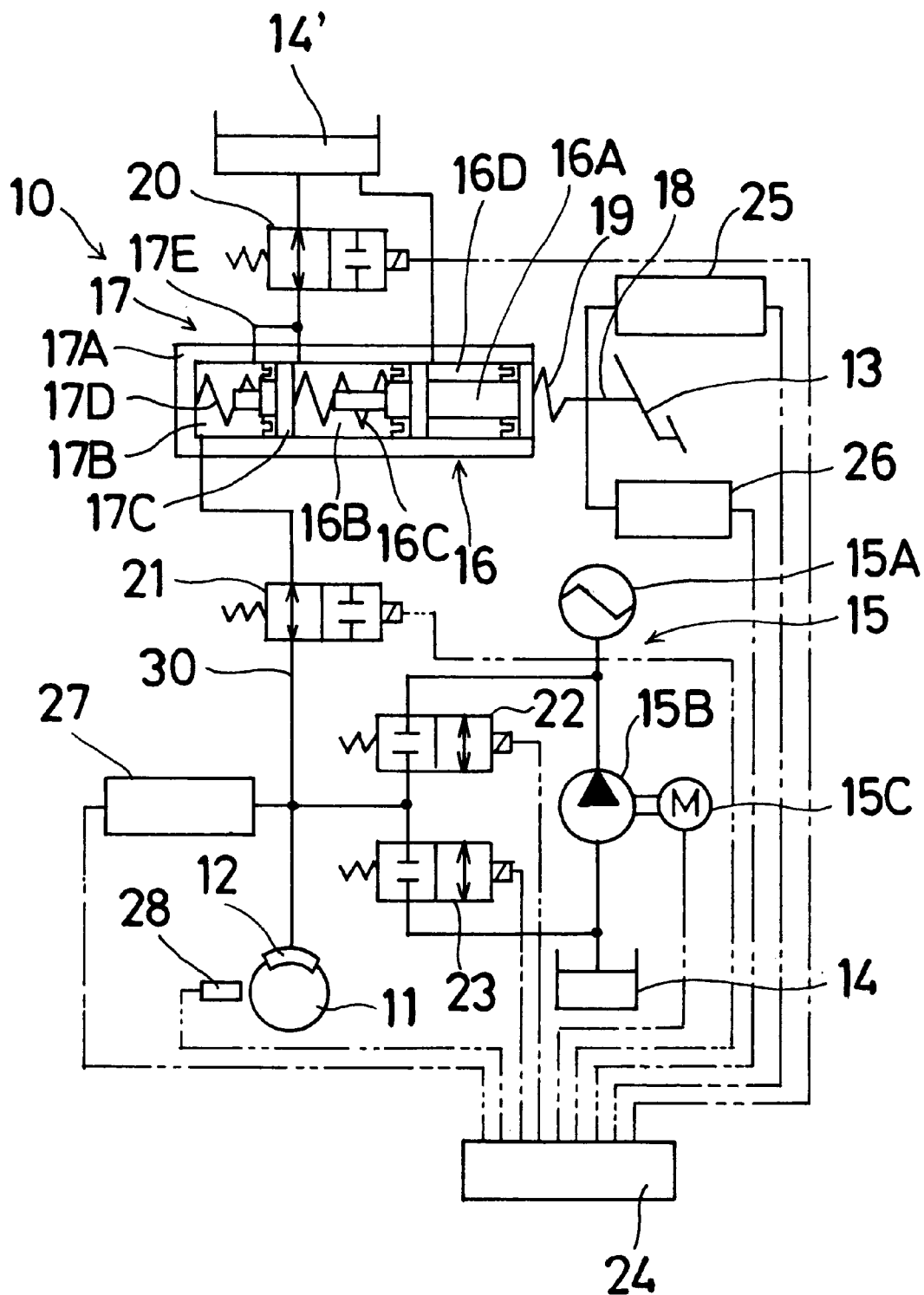
FIG. 1 is a circuit diagram of a hydraulic braking device according to a first embodiment of the present invention.

With reference initially to FIG. 1 which illustrates a vehicle hydraulic brake device 10 according to a first embodiment of the present invention includes a wheel brake 12 for applying a braking force to a wheel 11 having a magnitude corresponding to the magnitude of the hydraulic pressure applied to the wheel brake, a brake pedal 13, a brake fluid reservoir 14, a power hydraulic pressure source 15 for generating hydraulic pressure which is applied to the wheel brake 12, a pedal stroke simulator 16 for generating a stroke corresponding to the operating force applied to the brake pedal 13, and a master cylinder 17 for generating hydraulic pressure which is applied to the wheel brake 12 when the power hydraulic pressure source 15 is experiencing an abnormal condition or is non-operational.

The power hydraulic pressure source 15 includes an accumulator 15A, a hydraulic pressure pump 15B which draws in brake fluid stored in the brake fluid reservoir 14 and discharges or supplies the accumulator 15A with the pressurized brake fluid, and an electric motor which drives the hydraulic pressure pump 15B.

The master cylinder 17 includes a cylinder 17A defining a bore having oppositely located closed and open ends, a piston 17C which is slidably fitted in the bore of the cylinder 17A in a fluid tight manner, and a piston return spring 17D which is interposed between the closed and of the bore and the piston 17C. The piston 17C forms a pressure chamber 17B in the bore of the cylinder 17A.

A piston 16A forming a part of the pedal stroke simulator 16 is slidably fitted into the bore of the cylinder 17A in a fluid tight manner and is located at the open end side of bore in the cylinder 17A. A spring 16C for stroke simulation is interposed between the piston 16A and the piston 17C, and a fluid chamber 16B is formed between the piston 16A and the piston 17C. An input rod 18 in connected to the brake pedal 13 and a spring 19 operating as a load transmitting elastic member is interposed between the input rod 18 and the piston 16A. Therefore, the piston 16A is capable of being pressed or urged towards the piston 17C through the spring 19 by the input rod 18.

Land portions formed on both ends of the piston 16A are slidably fitted into the bore of the cylinder 17A in a fluid tight manner, and a circular fluid chamber 16D is formed in the bore between the land portions of the piston 16A. The circular fluid chamber 16D is always in communication with the brake fluid reservoir 14' and the fluid chamber 16B is able to communicate with the brake fluid reservoir 14' through a normally open type electromagnetic switching valve 20. A diverging passage 17E extends between the pressure chamber 17B and a passage connecting the fluid chamber 16B to the switching valve 20. The diverging passage 17E allows fluid communication between the pressure chamber 17B and the brake fluid reservoir 14' through the switching valve 20 when the piston 17C is located at its return position shown in FIG. 1. The fluid communication between the pressure chamber 17B and the brake fluid reservoir 14' is interrupted by the piston 17C when the piston 17C slidably moves in the leftward direction from its return position shown in FIG. 1 by a predetermined distance. As the switching valve 20 is selectively opened and closed, fluid communication between the fluid chamber 16B and the brake fluid reservoir 14 and between the pressure chamber 17B and the brake fluid reservoir 14 is permitted and prevented. The switching valve 20 causes the pedal stroke simulator 16 to selectively lock as described in more detail below.

A normally open type electromagnetic switching valve 21 is disposed in a passage 30 that communicates the pressure chamber 17B to the wheel brake 12. A portion of the passage 30 located between the wheel brake 12 and the switching valve 21 communicates with the accumulator 15A through a normally closed type electromagnetic switching valve 22, and a portion of the passage 30 is also in communication with the brake fluid reservoir 14' through a normally closed type electromagnetic switching valve 23. The switching valve 21 is closed to interrupt fluid communication between the pressure chamber 17B and the wheel brake 12 when hydraulic pressure is applied from the power hydraulic pressure source 15 to the wheel brake 12. The switching valve 22 is selectively closed and opened for controlling the application of hydraulic pressure from the accumulator 15A to the wheel brake 12. The switching valve 23 is selectively closed and opened for controlling the discharge of the hydraulic pressure from the wheel brake 12 to the brake fluid reservoir 14.

The ON-OFF operations of the switching valves 20, 21, 22, 23 and the operation of the electric motor 15C are controlled by an electric control device 24. The electric control device 24 temporarily operates the electric motor 15C immediately after the vehicle engine is started. Then, the electric control device 24 estimates the hydraulic pressure in the accumulator 15A on the basis of the value of the current supplied to the electric motor 15C. The electric control device 24 then controls the operation of the electric motor 15C to maintain the hydraulic pressure in the accumulator 15A within a predetermined range. Further, the electric control device 24 continually monitors or checks the condition of the power hydraulic pressure source 15 and detects the malfunction of the power hydraulic pressure source 15.

An operating force sensor 25 for detecting the operating force applied to the brake pedal 13 and a stroke sensor 26 for detecting the stroke of the brake pedal 13 are mounted on or operatively associated with the input rod 18. A pressure sensor 27 for detecting the hydraulic pressure applied to the wheel brake 12 is provided at the portion of the passage 30 between of the wheel brake 12 and the switching valve 21, and a speed sensor 28 for detecting the rotational speed of the wheel 11 is disposed near the wheel 11. The output signals of these sensors 24, 25, 27, 28 are fed to the electric control device 24. When the brake pedal 13 is operated under the normal condition of the power hydraulic pressure source 15, the electric control device 24 calculates a target hydraulic pressure value which is applied to the wheel brake 12. At the same time, the electric control device 24 closes the switching valve 21 and controls the ON-OFF operations of the switching valves 22, 23 so that the hydraulic pressure in the wheel brake 12 detected by the pressure sensor 27 coincides with the target value.

Further, when the electric control device 24 detects the locking tendency of the wheel 11 by the detected output signal of the speed sensor 28 under the normal condition of the power hydraulic pressure source 15, the electric control device 24 closes the switching valve 22 and opens the switching valve 23 to allow hydraulic pressure to be discharged to the reservoir 14 to decrease the hydraulic pressure applied to the wheel brake 12. As soon as the locking tendency of the wheel disappears, the electric control device 24 opens the switching valve 22 and closes the switching valve 23 to once again increase the hydraulic pressure applied to the wheel brake 12. The electric control device 24 thus performs what is typically referred to as anti-lock control.

The operation of the hydraulic brake device having the above described structure is as follows. When the driver operates the brake pedal 13 under the normal condition of the power hydraulic pressure source 15, the switching valve 21 is closed by the electric control device 24 as mentioned above and the pistons 16A, 17C slidably move towards the closed end of the bore of the cylinder 17A. As the piston 17C of the master cylinder 17 slidably moves from the return position shown in FIG. 1 towards the closed end of the bore by a predetermined distance, fluid communication between the pressure chamber 17B and the brake fluid reservoir 14 is interrupted by the piston 17C. The piston 17C cannot slide towards the closed end of the bore after the interruption of fluid communication between the pressure chamber 17B and the brake fluid reservoir 14. However, a stroke corresponding to the magnitude of the operating force applied to the brake pedal 13 is generated on the brake pedal 13 by the spring 19 and the pedal stroke simulator 16. Thus, the operation force applied to the brake pedal 13 is applied from the input rod 18 to the piston 16A through the spring 19. The load or force Fl required for causing the piston 16A to begin sliding is determined by the sliding resistance of the piston 16A, a set load of the spring 16C, a sliding resistance of the piston 17C and a set load of the spring 17D. The set load Fs of the spring 19 is set to be lower than the load Fl and a maximum load Fm of the spring 19 is set to be higher than the load Fl. Therefore, when the load applied from the input rod 18 to the piston 16A through the spring 19 is higher than the set load Fs and is equal to or lower than the load Fl, the stroke of the brake pedal 13 is generated by the elastic deformation of the spring 19. When the load applied from the input rod 18 to the piston 16A through the spring 19 is higher than the load Fl and is equal to or lower than the maximum load Fm, the stroke of the brake pedal 13 is generated by the elastic deformation of the springs 16C and 19. When the load applied from the input rod 18 to the piston 16A through the spring 19 is higher than the maximum load Fm, the stroke of the brake pedal 13 is generated by the elastic deformation of the spring 16C.

Figure 6:
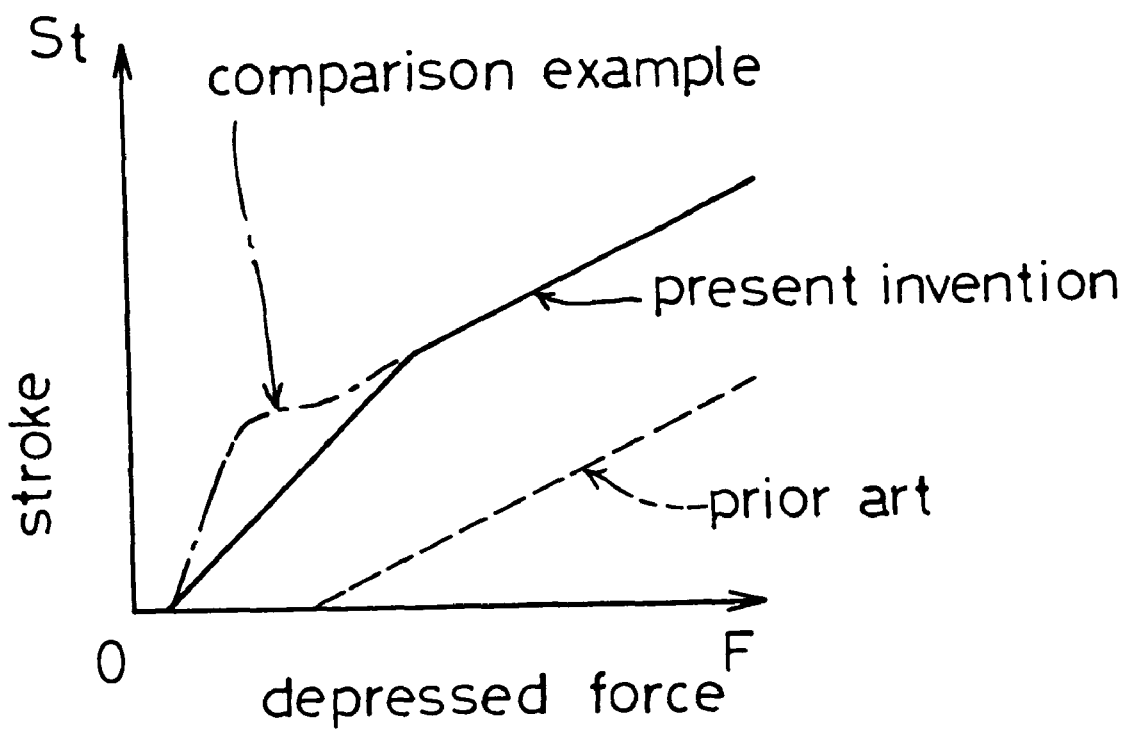
FIG. 6 is a graph showing a relationship between the depression force applied to a brake pedal and the brake pedal stroke in the case of the present invention as well as a comparative example and a known type of device.

FIG. 6 is a graph showing the relationship between the brake pedal depressing force and the stroke of the brake pedal in accordance with the present invention, as well as according to a comparative example and a known device. The known device corresponds to a hydraulic brake device in which the piston of the pedal stroke simulator or the piston of the master cylinder is directly connected to the input rod as described above. The comparative example corresponds to a hydraulic brake device in which a spring is interposed between the brake pedal and the piston of the pedal stroke simulator or the piston of the master cylinder, with the set load and the maximum load of the spring being set higher than the load required for causing the piston to begin sliding.

As clearly shown in FIG. 6, in accordance with the present invention, because the spring 19 whose set load Fs is lower than the load Fl required for causing the piston 16A of the pedal stroke simulator 16 to begin sliding is interposed between the piston 16A and the brake pedal 13, the stroke of the brake pedal 13 begins with a small depression force applied to the brake pedal 13 as compared to the known prior art device. As a result, the operational feeling of the brake pedal 13 is advantageously improved. Further, because the maximum load Fm of the spring 19 is higher than the load Fl required to cause the piston 16A of the pedal stroke simulator 16 to begin sliding, a rapid increase in the depressed force required for forcing the brake pedal during the operation of the brake pedal is avoided, thus further improving the operational feeling of the brake pedal 13. In contrast, in the comparative example, because the maximum load of the spring is lower than the load required for initiating movement of the piston, the piston does not begin to slide when the load of the spring reaches its maximum load. Therefore, the depression force required for moving the brake pedal increases rapidly, thereby causing a deterioration in the operational feeling associated with the brake pedal.

When the electric control device 24 detects a malfunction of the power hydraulic pressure source 15, the electric control device 24 maintains the switching valves 21, 22, 23 in their respective initial or normal positions. Further, the switching valve 20 is closed by the electric control device 24 during the operation of the brake pedal 13 in response to brake pedal operation. The fluid chamber 16B is thus hermetically sealed and the piston 17C slides with the piston 16A as one unit. Accordingly, the piston 17C is slid by the operation of the brake pedal 13 and hydraulic pressure is then applied from the pressure chamber 17B to the wheel brake 12.

Figure 2:
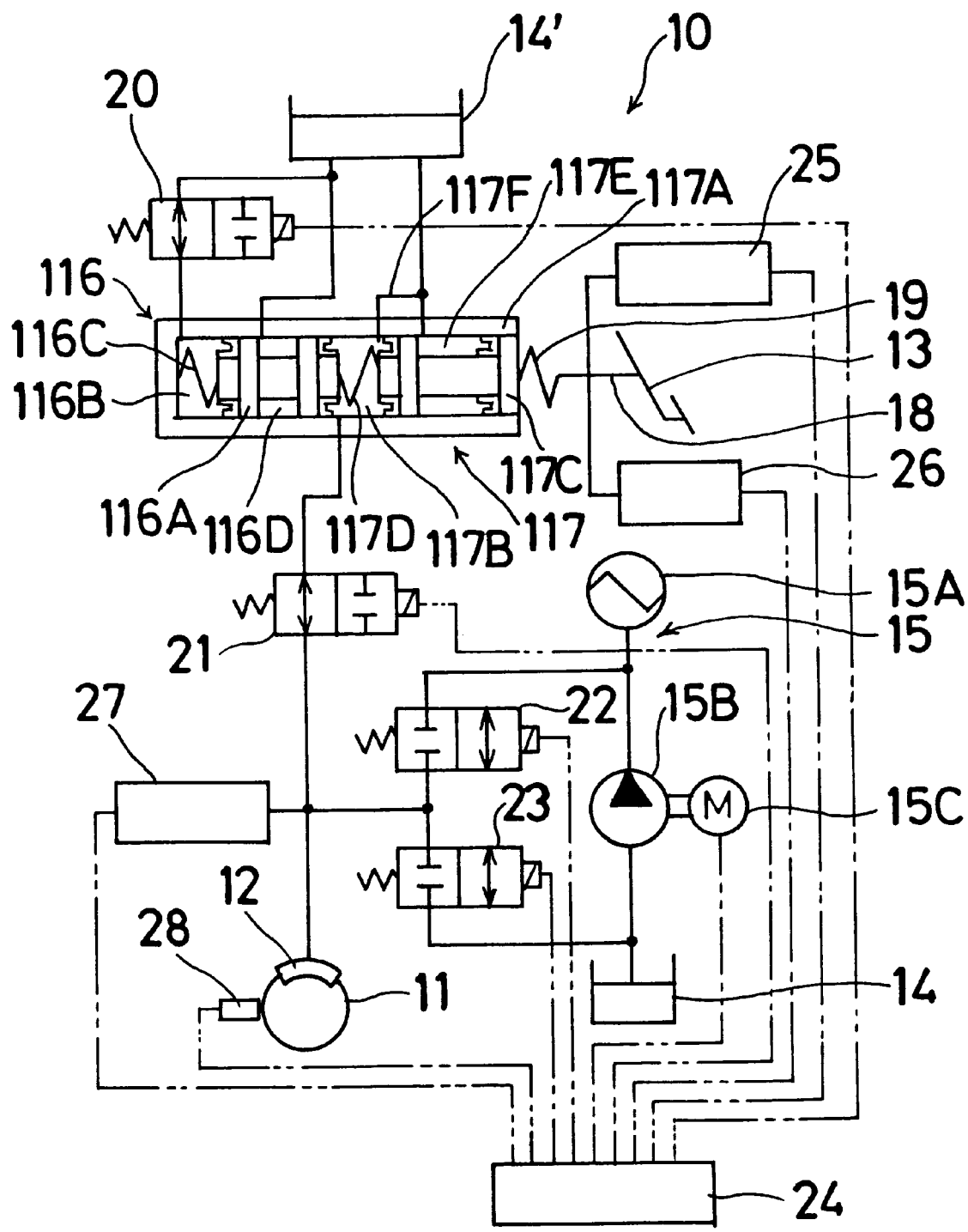
FIG. 2 is a circuit diagram of a hydraulic braking device according to a second embodiment of the present invention.

FIG. 2 shows a circuit diagram of a vehicle hydraulic brake device in accordance with a second embodiment of the present invention. The second embodiment differs from the first embodiment shown in FIG. 1 with respect to the structure of the pedal stroke simulator 116 and the master cylinder 117. In FIG. 2, the parts of the overall device corresponding to those described above and shown in FIG. 1 are identified by the same reference numerals.

In the second embodiment shown in FIG. 2, the master cylinder 117 includes a cylinder 117A having a bore that possesses oppositely located open and closed ends, a piston 117C which in slidably fitted in the bore of the cylinder 117A in a fluid tight manner to form a pressure chamber 11B in the bore, and a return spring 117D which urges the piston 117C toward the open end of the bore. An annular or circular supply chamber 117E is formed between land portions of the piston 117C and is always in communication with the brake fluid reservoir 14'. A diverging passage 117F is provided between the pressure chamber 117B and a passage extending between the supply chamber 117E and the brake fluid reservoir 14'. The diverging passage 117F allows fluid communication between the pressure chamber 117B and the brake fluid reservoir 14' when the piston 117C is located at its return position shown in FIG. 2. Fluid communication between the pressure chamber 117B and the brake fluid reservoir 14' is interrupted by the piston 117C when the piston 117C slides leftward from its return position shown in FIG. 2 over a predetermined distance.

A piston 116A of the pedal stroke simulator 116 is slidably fitted into the bore of the cylinder 117A in a fluid tight manner at the side adjacent the closed end of the bore. A fluid chamber 116B is formed between the closed end of the bore and the piston 116A. The pressure chamber 117B is formed between the two pistons 117C, 116A. A spring 116C for stroke simulation is interposed between the piston 116A and the closed end of the bore and the spring 117D is interposed between the two pistons 117C, 116A.

Land portions which are slidably fitted in the bore of the cylinder 117A in a fluid tight manner are formed on both ends of the piston 116A, and a circular or annular fluid chamber 116D is formed in the bore of the cylinder 117A between the land portions of the piston 116A. The annular fluid chamber 116D is always in communication with the brake fluid reservoir 14, and the fluid chamber 116B is always in communication with the brake fluid reservoir 14 through a normally open type electromagnetic switching valve 20.

When the brake pedal 13 is depressed, the piston 117C of the master cylinder 117 is pressed towards the piston 116A through the spring 19 by the input rod 18. A set load of the spring 19 is set to be lower than the load or force required for causing the piston 117C to begin sliding. The maximum load of the spring 19 is set to be higher than the load or force required for causing the piston 117C to begin sliding. The vehicle hydraulic braking device according to this second embodiment exhibits the characteristics shown in FIG. 6 and is able to achieve the same advantageous effects as the above-described first embodiment.

Figure 3:
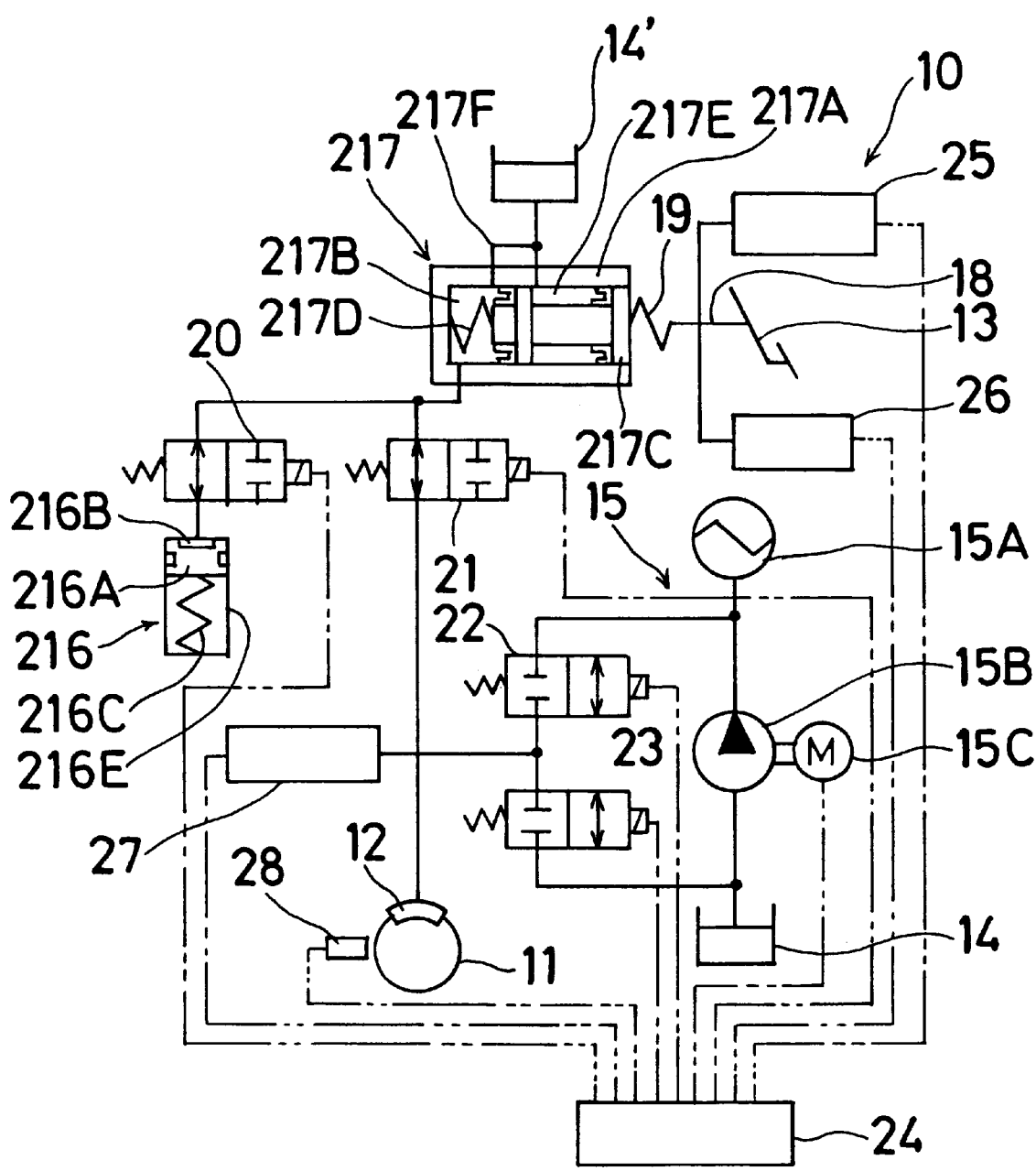
FIG. 3 is a circuit diagram of a hydraulic braking device according to a third embodiment of the present invention.

FIG. 3 illustrates a circuit diagram according to a third embodiment of a vehicle hydraulic brake device in accordance with the present invention. The third embodiment differs from the second embodiment shown in FIG. 2 with respect to the structures of the pedal stroke simulator 216 and the master cylinder 217. The parts of the overall vehicle hydraulic braking device corresponding to those described above and shown in FIG. 2 are identified by the same reference numerals.

In the third embodiment illustrated in FIG. 3, the master cylinder 217 includes a cylinder 217A having a bore possessing oppositely located open and closed ends, a piston 217C slidably fitted into the bore of the cylinder 217A in a fluid tight manner to form a pressure chamber 217B between one end of the piston 217C and the closed end of the bore, and a return spring 217D which urges the piston 217C towards the open end of the bore. A circular or annular supply chamber 217E is formed in the bore between land portions of the piston 217C and is always in communication with the brake fluid reservoir 14'. A diverging passage 217F is provided between the pressure chamber 217B and a passage connecting the supply chamber 217E to the brake fluid reservoir 14. The diverging passage 217F allows fluid communication between the pressure chamber 217B and the brake fluid reservoir 14' when the piston 217C is located at its return position shown in FIG. 3. Fluid communication between the pressure chamber 217B and the brake fluid reservoir 14' is interrupted by the piston 217C when the piston 217C slidably moves leftward from its return position shown in FIG. 3 over a predetermined distance.

The pedal stroke simulator 216 includes a cylinder 216E having a bore possessing oppositely located closed ends, a piston 216A slidably fitted into the bore in a fluid tight manner and forming a fluid chamber 216B between one end of the piston 216A and one of the closed ends of the bore of the cylinder 216E, and a spring 216C for stroke simulation which is interposed between the opposite end of the piston 216A and the other closed end of the bore of the cylinder 216E. The return spring 216E normally urges the piston 216A towards the fluid chamber 216B. The fluid chamber 216B is always communicated to the pressure chamber 217B of the master cylinder 217 through the normally open type electromagnetic switching valve 20.

When the brake pedal 13 is depressed, the piston 217C of the master cylinder 217 is pressed towards the pressure chamber 217B through the spring 19 by the input rod 18. A set load of the spring 19 is set to be lower than the load or force required for causing the piston 217C to begin sliding and the maximum load of the spring 19 is set higher than the load or force required for causing the piston 217C to begin sliding. The vehicle hydraulic braking device according to this third embodiment exhibits the characteristics shown in FIG. 6 and is able to achieve the same advantageous effects as the above-described first embodiment.

Figure 4:
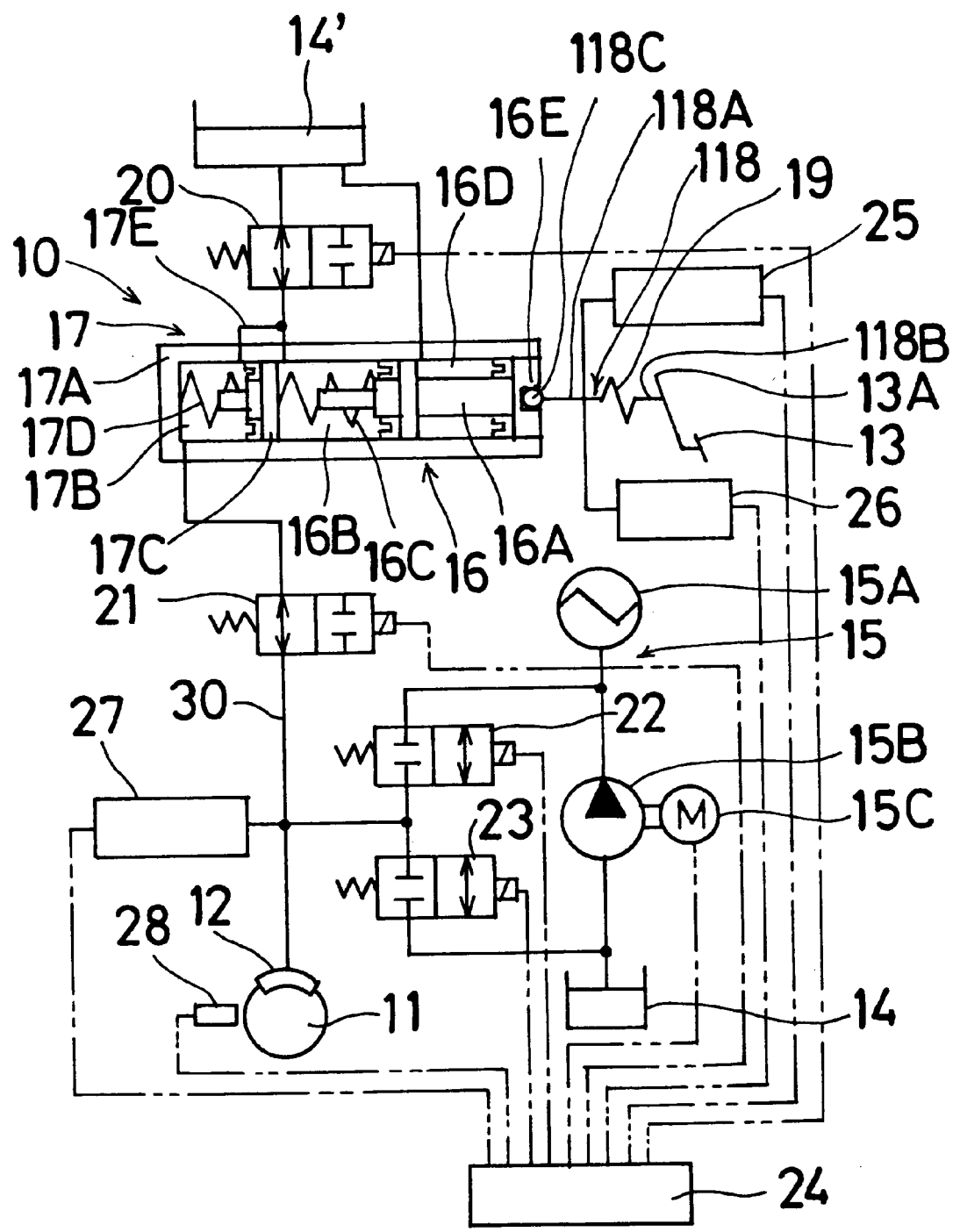
FIG. 4 is a circuit diagram of a hydraulic braking device according to a fourth embodiment of the present invention.

FIG. 4 depicts a circuit diagram of a hydraulic brake device for a vehicle in accordance with a fourth embodiment of the present invention. The fourth embodiment differs from the first embodiment shown in FIG. 1 with regard to the structure of the input rod 118. The parts of the overall vehicle hydraulic braking device shown in FIG. 4 that correspond to those described above and shown in FIG. 1 are identified by the same reference numerals.

In the fourth embodiment shown in FIG. 4, the input rod 118 is divided into a first input rod 118A and a second input rod 118B. One end of the first input rod 118A is connected to the piston 16A of the pedal stroke simulator 16 through a ball joint 118C. The ball joint 118C is accommodated in a concave or recessed portion 16E formed at one end surface of the piston 16A. The first input rod 118A can thus move axially with the piston 16A as a single unit and can oscillate relative to the piston 16A while the ball joint 118C functions as a fulcrum. One end of the second input rod 118B is connected to the brake pedal 13 and the other end of the second input rod 118B is connected to the opposite end of the first input rod 118B through a spring 19 so that the second input rod 118B is able to oscillate relative to the piston 16A.

By virtue of this construction which allows the first and second input rods 118A, 118B to oscillate relative to the piston 16A, when the brake pedal 13 oscillates while its supporting end 13A functions as a fulcrum, the oscillatory motion operation of the brake pedal 13 is relatively smooth and is ensured.

Due to the spring 19, the first and second input rods 118A, 118B are able to move relative to each other. The spring 19 is disposed at the brake pedal side with respect to the fulcrum of the oscillatory motion of the input rod 118 (i.e. the ball joint 118C). Therefore, it is possible to lengthen the distance between the fulcrum of the oscillatory motion of the input rod 118 and the connecting portion of the input rod 118 connected to the brake pedal 13 to the greatest possible extent without lengthening the axial length of the master cylinder 17 and the pedal stroke simulator 16. It is also possible to make the oscillatory motion angle of the input rod 118 relatively small. As a result, the load or force which is applied to the piston 16A of the pedal stroke simulator 16 in the radial direction due to the oscillatory motion of the input rod 118 is rather small. Further, the piston 16A of the pedal stroke simulator 16 is able to smoothly slide in the axial direction. The vehicle hydraulic braking device according to this fourth embodiment exhibits the characteristics shown in FIG. 6 and is able to achieve the same advantageous effects as the above-described first embodiment.

Figure 5:
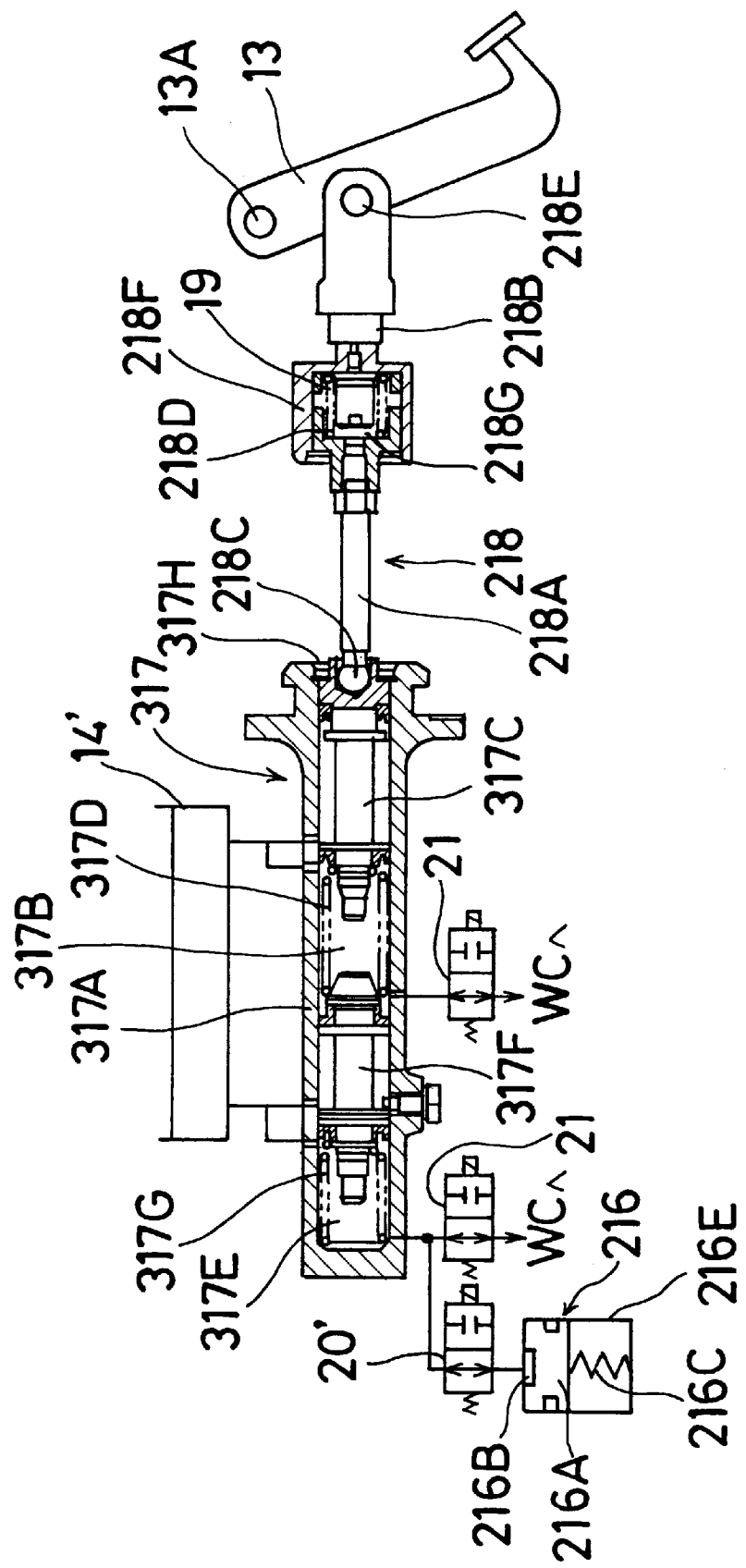
FIG. 5 is a circuit diagram of a hydraulic braking device according to a fifth embodiment of the present invention.

A general circuit diagram of a hydraulic brake device for a vehicle in accordance with a fifth embodiment of the present invention is shown in FIG. 5. This fifth embodiment of the hydraulic brake device differs from the third embodiment shown in FIG. 3 with respect to the structure of the master cylinder 317 and the input rod 218. The parts of the overall vehicle hydraulic braking device shown in FIG. 5 that correspond to those described above and shown in FIG. 3 are identified by the same reference numerals.

In the fifth embodiment illustrated in FIG. 5, the master cylinder 317 is the form of a tandem master cylinder. The master cylinder 317 includes a cylinder 317A having a bore which possess oppositely disposed open and closed ends, a pair of pistons 317C, 317F slidably fitted into the bore in a fluid tight manner and forming first and second pressure chambers 317D, 317E, and two return springs 317D, 317G. The first pressure chamber 317B formed between the pistons 317C, 317F is communicated through a normally open type electromagnetic switching valve 21 to two wheel cylinders (wheel brakes) that are located in one of two hydraulic pressure lines. The second pressure chamber 317E formed between the piston 317F and the closed end of the bore of the cylinder 317A communicates through a normally open type electromagnetic switching valve 21' to two wheel cylinders (wheel brakes) that are located in the other of the hydraulic pressure lines. Further, the second pressure chamber 317E communicates with the fluid chamber 216B of the pedal stroke simulator 216 through a normally open type electromagnetic switching valve 20'.

The input rod 218 includes a first input rod 218A and a second input rod 218B. The first input rod 218A is provided with a ball joint portion 218C at its one end and a cylindrical portion 218D at its the other end. The ball joint portion 218C of the first input rod 218A is connected to the piston 317C by being accommodated in a concave portion or recess 317H formed on the end surface of the piston 317C. The first input rod 218A is able to move axially with the piston 317C as a unit and can oscillate relative to the piston 317C while the ball joint portion 218C functions as a fulcrum.

The second input rod 218B is provided with a connecting portion 218E at its one end that is connected to the brake pedal 13 and is provided with a cylindrical portion 218F at its other and. The diameter of the cylindrical portion 218F of the second input rod 218B is larger than that of the cylindrical portion 218D of the first input rod 218A. The cylindrical portion 218F of the second input rod 218B accommodates and surrounds the cylindrical portion 218D of the first input rod 218A. A spring chamber 218G is formed between the cylindrical portion 218D of the first input rod 218A and the cylindrical portion 218F of the second input rod 218B.

The cylindrical portion 218D of the first input rod 218A is slidably fitted into the cylindrical portion 218F of the second input rod 218B in the axial direction and so the second input rod 218B is connected to the first input rod 218A so as to be able to oscillate relative to the piston 317C. A snap ring is fixed to the open end of the cylindrical portion 218F and prevents the cylindrical portion 218D of the first input rod 218A from moving out of the cylindrical portion 218F of the second input rod 218B. A spring 19 is disposed in the spring chamber 218G and urges the cylindrical portions 218D, 218F so that the cylindrical portion 218D of the first input rod 218A contacts the snap ring. The brake pedal 13 is able to oscillate with its supporting end 13A functioning as a fulcrum.

In this fifth embodiment, the spring 19 is disposed at the brake pedal side with respect to the fulcrum of the oscillatory motion of the input rod 118 (i.e. the ball joint portion 218C). The distance between the fulcrum of the oscillatory motion of the input rod 218 and the connecting portion 218E connected to the brake pedal 13 can thus be lengthened or increased to the greatest possible extent without lengthening the axial length of the master cylinder 317. The oscillatory motion angle of the input rod 218 can thus be made relatively small. As a result, it is possible to decrease the load applied to the piston 317C in the radial direction due to the oscillatory motion of the input rod 218. The piston 317C is thus able to smoothly slide in the axial direction. The vehicle hydraulic braking device according to this fifth embodiment exhibits the characteristics shown in FIG. 6 and is able to achieve the same highly desirable effects as the above-described first embodiment.

In the above-described five embodiments of the present invention, a load or force is transmitted from the input rod to the piston through the spring 19 which operates as a load transmitting member. However, in place of the spring 19, the load may be transmitted from the input rod to the piston through a load transmitting member made of rubber.

An mentioned above, according to the present invention, the load transmitting elastic member is interposed between the input rod and the piston of the master cylinder or the piston of the pedal stroke simulator to which the operational force of the brake pedal is applied from the input rod. The set load of the load transmitting elastic member is lower than a predetermined load required for making the piston begin to move or slide and the maximum load of the load transmitting elastic member is higher than this predetermined load. It is thus possible to realize a highly advantageous operation in which the initiation or beginning of the stroke of the brake pedal can be achieved with a relatively small depression force applied to the brake pedal as compared to known devices. Thus, the operational feeling of the brake pedal can be improved.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A master cylinder device for a vehicle having a brake pedal comprising:
   a pedal stroke simulator having a piston adapted to be connected to the brake pedal for generating a stroke corresponding to an operating force applied to the brake pedal, the piston of the pedal stroke simulator including a seal member which generates resistance to movement of the piston;
   a master cylinder operated by the operation of the brake pedal through the piston of the pedal stroke simulator; and
   a load transmitting elastic member adapted to be interposed between the piston of the pedal stroke simulator and the brake pedal, said load transmitting elastic member having a set load that is lower than a predetermined load required for initiating movement of the piston and having a maximum load that is higher than said predetermined load.

2. The master cylinder device as recited in claim 1, including an input rod having a first end adapted to be connected to the brake pedal and a second end connected to the piston of the pedal stroke simulator, said second end of the input rod being connected to the piston so as to permit oscillatory movement of the input rod relative to the piston while the second end of the input rod functions as a fulcrum, and said load transmitting elastic member being disposed adjacent the first end of the input rod.

3. A master cylinder device for a vehicle having a brake pedal comprising:
   a master cylinder having a piston adapted to be connected to the brake pedal, the piston of the master cylinder including a seal member which generates resistance to movement of the piston;
   a pedal stroke simulator for generating, upon operation of the brake pedal, a stroke corresponding to an operating force applied to the brake pedal; and a load transmitting elastic member adapted to be interposed between the piston of the master cylinder and the brake pedal, said load transmitting elastic member having a set load that is lower than a predetermined load required for causing the piston to begin moving and having a maximum load that is higher than said predetermined load.

4. The master cylinder device as recited in claim 3, including an input rod having a first end adapted to be connected to the brake pedal and a second end connected to the piston of the master cylinder, said second end of the input rod being connected to the piston so as to permit oscillatory movement of the input rod relative to the piston while the second end of the input rod functions as a fulcrum, and said load transmitting elastic member being disposed adjacent the first end of the input rod.

5. A hydraulic brake device for a vehicle having a brake pedal comprising:

a pedal stroke simulator having a piston connected to the brake pedal for generating, upon stroke of the brake pedal, a stroke corresponding to the operating force applied to the brake pedal, the piston of the pedal stroke simulator including a seal member which generates resistance to movement of the piston;

a master cylinder operated by operation of the brake pedal through the piston of the pedal stroke simulator;

a power hydraulic pressure source for generating hydraulic pressure;

a wheel brake mounted on a wheel of the vehicle for braking the wheel;

control means for applying hydraulic pressure from the power hydraulic pressure source to the wheel brake in response to operation of the brake pedal when the power hydraulic pressure source is in a normal condition and for applying hydraulic pressure from the master cylinder to the wheel brake when the power hydraulic pressure source is in an abnormal condition; and a load transmitting elastic member interposed between the piston of the pedal stroke simulator and the brake pedal, said load transmitting elastic member having a set load that is lower than a predetermined load required for initiating movement of the piston and having a maximum load that is higher than said predetermined load.

6. A hydraulic brake device for a vehicle having a brake pedal comprising:

a master cylinder having a piston connected to a brake pedal, the piston of the master cylinder including a seal member which generates resistance to movement of the piston;

a pedal stroke simulator for generating, upon stroke of the brake pedal, a stroke corresponding to an operating force applied to the brake pedal;

a power hydraulic pressure source for generating hydraulic pressure;

a wheel brake mounted on a wheel of the vehicle for braking the wheel;

hydraulic pressure control means for applying the hydraulic pressure from the power hydraulic pressure source to the wheel brake in response to operation of the brake pedal when the power hydraulic pressure source is in a normal condition and for applying hydraulic pressure from the master cylinder to the wheel brake when the power hydraulic pressure source is in an abnormal condition; and a load transmitting elastic member interposed between the piston of the master cylinder and the brake pedal, said load transmitting elastic member having a set load that is lower than a predetermined load required for initiating movement of the piston and having a maximum load that is higher than said predetermined load.

7. The master cylinder device as recited in claim 1, wherein the master cylinder includes a cylinder provided with a bore in which is disposed a master cylinder piston, and a first spring disposed in the bore and applying a biasing force to the master cylinder piston to urge the master cylinder piston towards the piston of the pedal stroke simulator.

8. The master cylinder device as recited in claim 7, including a second spring disposed between the master cylinder piston and the piston of the pedal stroke simulator.

9. The master cylinder device as recited in claim 1, wherein said load transmitting elastic member is a spring.

10. The master cylinder device as recited in claim 3, wherein said load transmitting elastic member is a spring.

11. The hydraulic brake device as recited in claim 5, wherein the master cylinder includes a cylinder provided with a bore in which is disposed a master cylinder piston, and a first spring disposed in the bore and applying a biasing force to the master cylinder piston to urge the master cylinder piston towards the piston of the pedal stroke simulator.

12. The hydraulic brake device as recited in claim 11, including a second spring disposed between the master cylinder piston and the piston of the pedal stroke simulator.

13. The hydraulic brake device as recited in claim 11, wherein said master cylinder piston defines a pressure chamber within the cylinder, and including a fluid chamber formed between the master cylinder piston and the piston of the pedal stroke simulator, said fluid chamber and said pressure chamber being connected to one another by a diverging passage.

14. The hydraulic brake device as recited in claim 11, wherein said master cylinder piston defines a pressure chamber within the cylinder, said pressure chamber being connected to the wheel cylinder by a passage in which is disposed a switching valve.

15. The hydraulic brake device as recited in claim 5, including an input rod having a first end adapted to be connected to the brake pedal and a second end connected to the piston of the pedal stroke simulator, said second end of the input rod being connected to the piston so as to permit oscillatory movement of the input rod relative to the piston while the second end of the input rod functions as a fulcrum, and said load transmitting elastic member being disposed adjacent the first end of the input rod.

16. The hydraulic brake device as recited in claim 6, wherein said load transmitting elastic member is a spring.

17. The hydraulic brake device as recited in claim 6, wherein said master cylinder includes a cylinder provided with a bore in which is disposed said piston, and a first spring disposed in the bore and applying a biasing force to the piston of the master cylinder to urge the piston of the master cylinder in a direction that is in opposition to the load transmitting elastic member, said piston of said master cylinder defining a supply chamber and a pressure chamber within the cylinder.

18. The hydraulic brake device as recited in claim 17, wherein said supply chamber and said pressure chamber are in communication with one another by way of a diverging passage.

19. The hydraulic brake device as recited in claim 17, wherein said pressure chamber is connected to the pedal stroke simulator by way of a passage in which is disposed a switching valve.

* * * * *